United States Patent
Kim et al.

(10) Patent No.: US 7,095,727 B2
(45) Date of Patent: Aug. 22, 2006

(54) SYSTEM AND METHOD FOR DETERMINING USE OF STTD ENCODING OF BASE SYSTEM

(75) Inventors: Young-Hoon Kim, Daejeon (KR); Kyung Yeol Sohn, Daejeon (KR); KyungHi Chang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 962 days.

(21) Appl. No.: 10/028,274

(22) Filed: Dec. 28, 2001

(65) Prior Publication Data

US 2002/0131382 A1    Sep. 19, 2002

(30) Foreign Application Priority Data

Nov. 1, 2001    (KR) .............................. 2001-67868

(51) Int. Cl.
*H04B 7/216*    (2006.01)

(52) U.S. Cl. ...................................... 370/335; 370/342
(58) Field of Classification Search ...................... None
See application file for complete search history.

(56) References Cited

U.S. PATENT DOCUMENTS

| | | | | |
|---|---|---|---|---|
| 6,005,887 | A * | 12/1999 | Bottomley et al. | 375/147 |
| 6,317,411 | B1 * | 11/2001 | Whinnett et al. | 370/204 |
| 6,728,302 | B1 * | 4/2004 | Dabak et al. | 375/148 |
| 6,859,484 | B1 * | 2/2005 | Okuyama | 375/130 |
| 6,862,275 | B1 * | 3/2005 | Dabak | 370/342 |
| 6,934,245 | B1 * | 8/2005 | Kwak et al. | 370/204 |
| 2002/0122557 | A1 * | 9/2002 | Aihara et al. | 380/261 |
| 2003/0048857 | A1 * | 3/2003 | Onggosanusi et al. | 375/267 |

FOREIGN PATENT DOCUMENTS

| | | |
|---|---|---|
| KR | 1020000055790 | 2/1999 |
| KR | 1020000067709 | 4/1999 |

OTHER PUBLICATIONS

Yi-Pin Eric Wang; Cell Search in W-CDMA; IEEE Journal on Selected Areas in Communications, vol. 18, No. 8; Aug. 2000; p. 1470-1482.

(Continued)

*Primary Examiner*—Hassan Kizou
*Assistant Examiner*—Anthony Sol
(74) *Attorney, Agent, or Firm*—Mayer, Brown, Rowe and Maw LLP

(57) ABSTRACT

A system in an asynchronous mobile communications system and located in a mobile station for determining use of space-time block-coding-based transmit diversity encoding in a base station including transmission antennas, comprises: a cell search unit for detecting frame timing information and scrambling codes of the base station from signals output from the base station; a descrambling unit for descrambling the signals output from the base station using the frame timing information and the scrambling codes; an accumulation processor for despreading the descrambled signals; a depatternization unit for depatternizing the despread signals using pilot symbol patterns corresponding to the two transmission antennas; and an accumulator bank unit for performing accumulation and addition processes of the depatternized signals to output signals corresponding to the transmission antennas.

22 Claims, 5 Drawing Sheets

OTHER PUBLICATIONS

TSG-RAN WG1 Meeting #4, Yokohama, Japan; Fast reliable detection of STTD encoding of PCCPCH with no L3 messaging overhead; Texas Instruments; Apr. 13, 1999; p. 1-7.

Siavash M. Alamouti; A Simple Transmit Diversity Technique for Wireless Communications; IEEE Journal on Select Areas in Communications, vol. 16, No. 8; Oct. 1998; p. 1451-1458.

Wang Hai, et al; The Impact of Cell Search on System Performance in WCDMA; IEEE 2000; p. 1425-1429.

3$^{rd}$ Generation Partnership Project; Technical Specification Group Radio Access Network; Physical channels and mapping of transport channels onto physical channels (FDD); p. 1-45.

* cited by examiner

SYSTEM AND METHOD FOR DETERMINING USE OF STTD ENCODING OF BASE SYSTEM

BACKGROUND OF THE INVENTION (a) Field of the Invention

The present invention relates to a next generation mobile communications system. More particularly, the present invention relates to a system and method for determining the use of forward channel transmit diversity, that is, STTD (Space-Time block-coding-based Transmit Diversity), encoding in a base station of an asynchronous broadband CDMA (Code Division Multiple Access) system.

(b) Description of the Related Art

Next generation mobile communications systems provide various high speed (2 Mbps) and high quality services such as multimedia capabilities.

With the goal of providing such services, the UTRAN (Universal Terrestrial Radio Access Network) FDD (Frequency Division Duplex) standard was made at the 3GPP ($3^{rd}$ Generation Partnership Project), which was a meeting that took place to create a third generation standard.

In wireless communications systems, there is a reduction in performance caused by a multi-path fading channel. A variety of methods are used to minimize this loss of performance.

Among the various methods, an effective way to prevent this problem is through the use of an antenna diversity technology, in which many antennas are used in a receiver of a base station. The basic reason for such a configuration is economic: a single base station may be used for many mobile stations, while use of a plurality of antennas in mobile stations is costly.

Many methods have been proposed to receive such benefits of diversity. The technology adopted in the 3GPP standard is an open-loop diversity STTD technology. The STTD technology was first proposed in 1998 by S. M. Alamouti (see Standardization Specifications 3GPP 3G TS 25.211).

STTD encoding adopted in the 3GPP standard is optional for a base station. Accordingly, even with an increase in added complexities, mobile stations and terminals must provide the ability to execute STTD demodulation in receivers.

When the power of a mobile station is first turned on, a three-stage cell search unit of a receiving end acquires timing information of a base station cell with the largest signal and a scrambling code number. Next, before system information sent through a primary common control physical channel (PCCPCH), which is a forward channel, is demodulated in the UTRAN, the receiver must compensate frequency offset between the base station and mobile stations. However, it must be known whether STTD encoding of the base station is being used to perform such frequency offset compensation.

It may be determined if STTD encoding of the base station is being used through symbols contained in a synchronization channel (SCH) as shown in FIG. 1.

FIG. 1 is a drawing showing a structure of a PCCPCH according to a 3GPP radio access network (RAN) standard. There is no transmission at an initial point of each slot during a 256-chip interval, and instead a primary SCH and a secondary SCH are transmitted in this interval.

Symbol (a) included in the primary SCH and the secondary SCH indicates whether STTD encoding of the base station is being used. That is, if a value of (a) is +1, STTD encoding is being used, while if the value of (a) is −1, this indicates that STTD encoding is not being used.

However, in this method of determining whether STTD decoding is being used through the symbol included in the SCHs of the PCCPCH, in the case where one base station is using STTD encoding and another is not using STTD encoding, and slot timings of the two base stations overlap, it is not possible to determine whether STTD encoding is being used for the base station cell with the largest reception signal.

Further, since there is no spreading gain if the SCHs do not perform spreading, errors as a result of multi-path fading and frequency offset are significant compared to other channels, thereby increasing the likelihood of making incorrect determinations of whether STTD encoding is being used.

SUMMARY OF THE INVENTION

The present invention has been made in an effort to solve the above problems.

It is an object of the present invention to provide a system and method for determining the use of STTD encoding of a base station in order to compensate a frequency offset in a multi-path fading channel environment.

In one aspect of the present invention, a system in an asynchronous mobile communications system and located in a mobile station for determining use of space-time block-coding-based transmit diversity encoding in a base station that includes two transmission antennas, comprises: a cell search unit for detecting frame timing information and scrambling codes of the base station from signals output from the base station; a descrambling unit for descrambling the signals output from the base station using the frame timing information and the scrambling codes, which are detected by the cell search unit; an accumulation processor for despreading the signals descrambled by the descrambling unit; a depatternization unit for performing depatternization of the signals despread by the logic processor using pilot symbol patterns corresponding to the two transmission antennas of the base station; and an accumulator bank unit for performing accumulation and addition processes of the signals that have undergone depatternization by the depatternization unit to output signals corresponding to the transmission antennas.

In another aspect of the present invention, a method in an asynchronous mobile communications system for determining use of space-time block-coding-based transmit diversity encoding in a base station comprises: (a) detecting scrambling codes through a common pilot channel transmitted from the base station which includes two transmission antennas; (b) generating pilot symbols using the detected scrambling codes; (c) performing depatternization of the generated pilot symbols using pilot symbol patterns corresponding to each of the two transmission antennas; (d) performing accumulation and addition processes of the two pilot symbols having undergone depatternization, and outputting the symbols as signals corresponding to each of the two transmission antennas; and (e) comparing energy values of the two output signals corresponding to the transmission antennas to determine if space-time block-coding-based transmit diversity encoding of the base station is being used.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
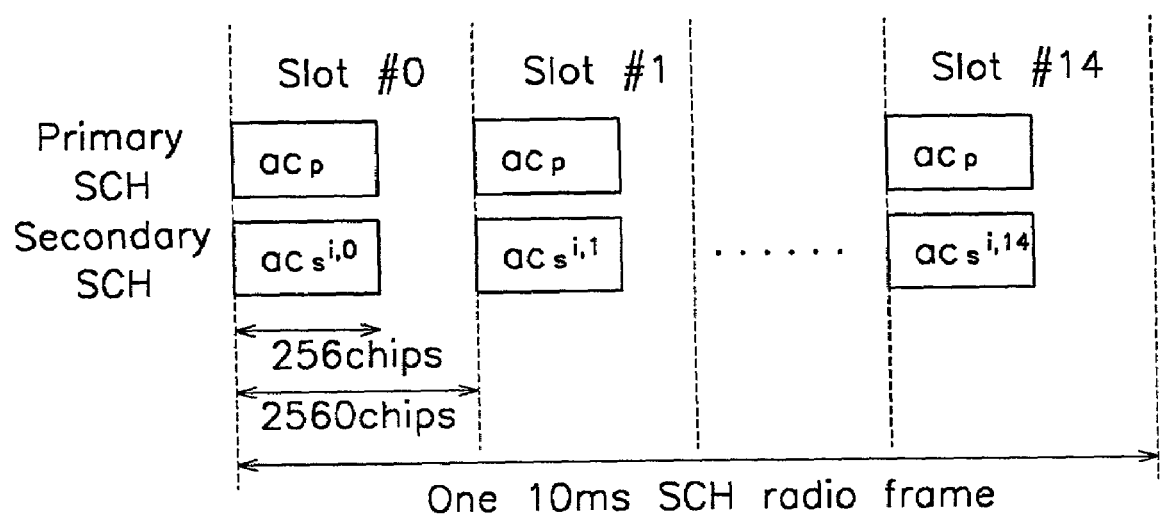
FIG. 1 is a drawing showing a structure of a forward synchronization channel of an asynchronous broadband CDMA system.
Figure 2:
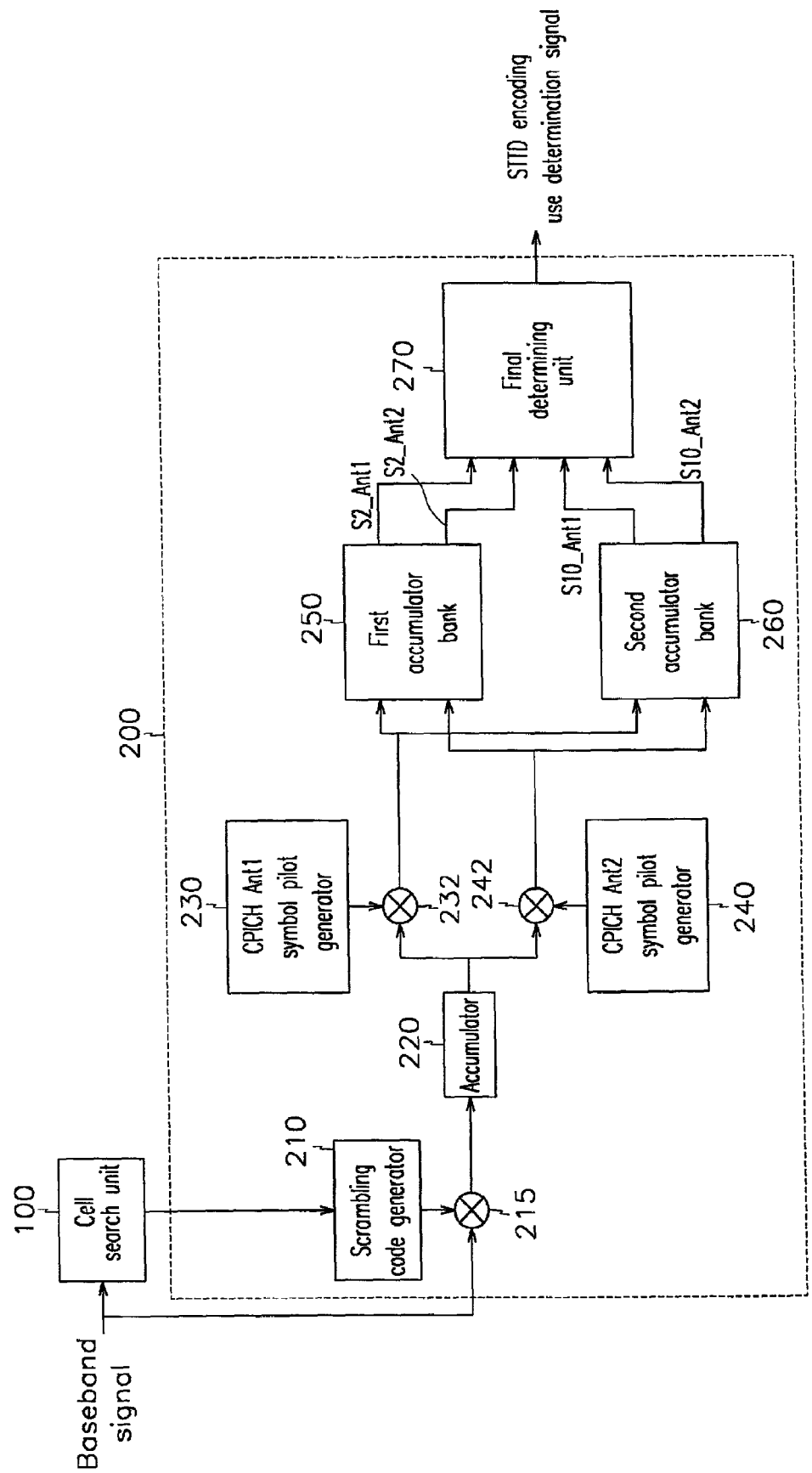
FIG. 2 is a block diagram of a system for determining use of STTD encoding of a base station according to a preferred embodiment of the present invention.

FIG. 2 is a block diagram of a system for determining use of STTD encoding of a base station according to a preferred embodiment of the present invention.

As shown in FIG. 2, a system for determining use of STTD encoding of a base station according to a preferred embodiment of the present invention includes a cell search unit 100 and an STTD encoding usage-determining unit 200.

In the case where the cell search unit 100 is already installed in mobile to stations, the corresponding cell search unit 100 may be used.

In the following description, although it is assumed that two antennas are used in the base station, the present invention is not limited to this configuration and it is possible to increase the number of antennas.

The STTD encoding usage-determining unit 200 includes a scrambling code generator 210; an accumulator 220; multipliers 215, 232, and 242; a CPICH Ant1 symbol pilot generator 230; a CPICH Ant2 symbol pilot generator 240; a first accumulator bank 250; a second accumulator bank 260; and a final determining unit 270.

The cell search unit 100 searches a base station covering a corresponding mobile station through I, Q baseband signals received externally, and it obtains a frame time of base stations and corresponding scrambling codes. In the preferred embodiment of the present invention, in order to determine use of STTD encoding of a base station, a CPICH is used among the channels transmitted from the base stations, and among the CPICH transmitted from the base stations, the cell search unit 100 uses, in particular, P-CPICH to detect a frame timing of base stations and corresponding scrambling codes.

The scrambling code generator 210, using a scrambling code of a base station and timing information obtained by the cell search unit 100, generates a scrambling code that is synchronized to a frame timing of a base station.

The scrambling code generated by the scrambling code generator 210 is multiplied by the multiplier 215 by an I, Q baseband signal, which is input while being synchronized to correct timing, such that the scrambling code is descrambled.

The signal descrambled by the multiplier 215 undergoes despreading by the accumulator 220 such that a P-CPICH symbol expressed as in Equation 1 below is obtained.

$$r(n) = \sqrt{E_{CPICH}} C_{CPICH}^1(n) + \sqrt{E_{CPICH}} C_{CPICH}^2(n) + \eta(n)$$

where $C^1_{CPICH}(n)$ and $C^2_{CPICH}(n)$ are despread CPICH $n^{th}$ symbols of antenna 1 (Ant1) and antenna 2 (Ant2), respectively, and $\eta(n)$ indicates interference.

Figure 3:
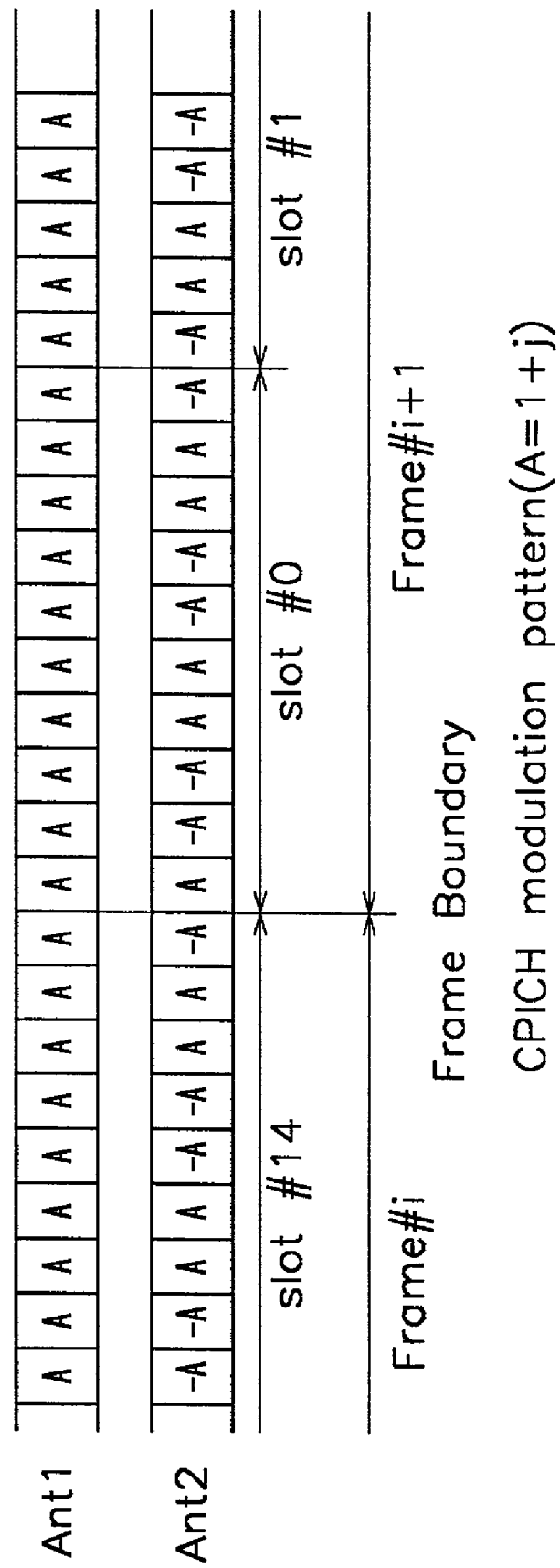
FIG. 3 is a drawing showing a structure of a forward joint pilot channel of an asynchronous broadband CDMA system.

The CPICH Ant1 symbol pilot generator 230 and the CPICH Ant2 symbol pilot generator 240, with reference also to FIG. 3, generate pilot symbols for antenna 1 and antenna 2, respectively (see 3GPP standard TS 25.211). At this time, the pilot symbols for the two antennas generated by the symbol pilot generators 230 and 240 are orthogonal to one another.

The multiplier 232 multiplies a pilot symbol pattern generated by the CPICH Ant1 symbol pilot generator 230 to the signal r(n) that is despread by the accumulator 220 to thereby perform depatternization. A signal depatternized by the multiplier 232 is expressed by Equation 2 below.

$$\Phi^1(m) = \sum_{l=0}^{M-1} r(l) \otimes C_{CPICH}^1(l) \qquad [\text{Equation 2}]$$

$$= \begin{cases} 2M\sqrt{E_{CPICH}}, & \text{when STTD encoding not used} \\ M\sqrt{E_{CPICH}}, & \text{when STTD encoding used} \end{cases}$$

where M is a length correlated by a factor of 2, 4, . . . , 10, m is a quotient when dividing M by n (m=M div n), I is a remainder when dividing M by n (I =M mod n), $\otimes$ is a complex number correlation, and $\Phi^1(m)$ represents an energy of antenna 1.

Similarly, the multiplier 242 multiplies a pilot symbol pattern generated by the CPICH Ant2 symbol pilot generator 240 and the signal r(n) that is despread by the accumulator 220 to thereby perform depatternization. A signal depatternized by the multiplier 242 is expressed by Equation 3 below.

$$\Phi^2(m) = \sum_{l=0}^{M-1} r(l) \otimes C_{CPICH}^2(l) \qquad [\text{Equation 3}]$$

$$= \begin{cases} 0, & \text{when STTD encoding not used} \\ M\sqrt{E_{CPICH}}, & \text{when STTD encoding used} \end{cases}$$

where $\phi^2(m)$ represents an energy of antenna 2.

The first accumulator bank 250 and the second accumulator bank 260 each receive both signals $\Phi^1(m)$ and $\Phi^2(m)$ output by the multipliers 232 and 242, respectively.

The first accumulator bank 250 and the second accumulator bank 260 receive the signals $\Phi^1(m)$ and $\Phi^2(m)$ output respectively by the multipliers 232 and 242, and perform accumulation and addition processes to output signals S2_Ant1, S2_Ant2, S10_Ant1, and S10_Ant2 corresponding to the antenna 1 pattern and the antenna 2 pattern. At this time, although the first accumulator bank 250 and the second accumulator bank 260 output signals corresponding to both the antenna 1 pattern and the antenna 2 pattern, since during accumulation processing accumulation lengths (i.e., depatternization lengths) are different, a size of each signal may be different.

In the preferred embodiment of the present invention, a depatternization length of the first accumulator bank 250 is 2, and a depatternization length of the second accumulator bank 260 is 10. However, the present invention is not limited to these parameters, and in the case where a frequency offset of a particular range is permitted, different depatternization lengths may be established.

The first accumulator bank 250 and the second accumulator bank 260 will now be described in more detail.

Figure 4:
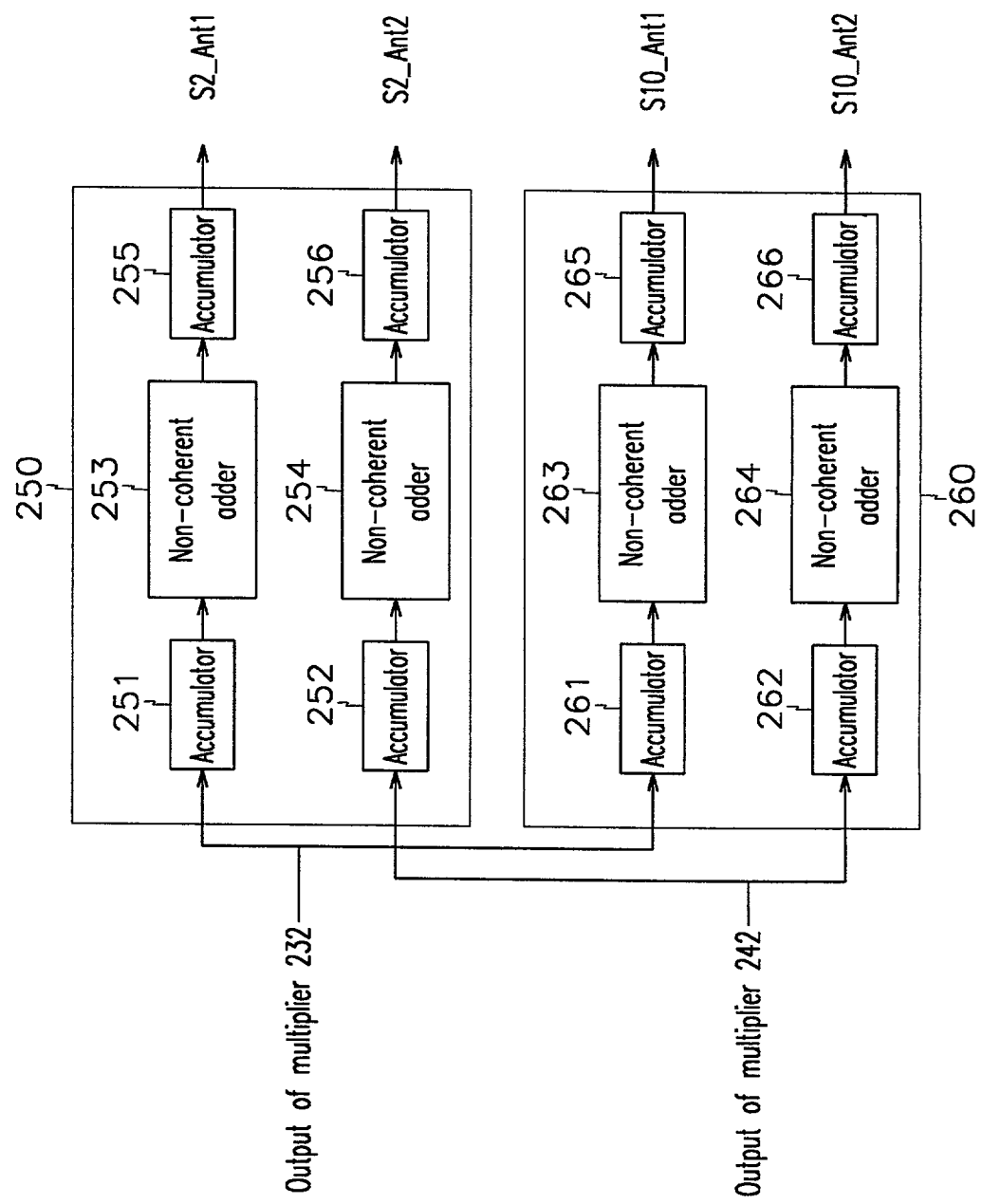
FIG. 4 is a detailed block diagram of a first accumulator bank and a second accumulator bank shown in FIG. 2.

FIG. 4 is a detailed block diagram of the first accumulator bank 250 and the second accumulator bank 260 shown in FIG. 2.

As shown in FIG. 4, the first accumulator bank 250 includes four accumulators 251, 252, 255, and 256, and two non-coherent adders 253 and 254. Also, the second accumulator bank 260 includes four accumulators 261, 262, 265, and 266, and two non-coherent adders 263 and 264.

The accumulator 251 of the first accumulator bank 250 accumulates the signal $\Phi^1(m)$ output from the multiplier 232 every 2 symbols then performs output, and the accumulator 252 accumulates the signal $\Phi^2(m)$ output from the multiplier 242 every 2 symbols then performs output. Accumulation every 2 symbols is performed since the correlation length, that is, the depatternization length, of the first accumulator bank 250 is 2.

The non-coherent adder 253 receives the signals accumulated in and output from the accumulator 251, and adds and outputs signals having in-phase and quadrature-phase elements. The non-coherent adder 254 receives the signals accumulated in and output from the accumulator 252, and similarly adds and outputs signals having in-phase and quadrature-phase elements.

The accumulator 255 accumulates the signals output from the non-coherent adder 253 by as many as several slots (N slots), then performs output as an accumulation result signal S2_Ant1 according to the antenna 1 pattern. The accumulator 256 accumulates the signals output from the non-coherent adder 254 by as many as several slots (N slots), then performs output as an accumulation result signal S2_Ant2 according to the antenna 2 pattern. Here, a slot length N, that is, an accumulation length N, is adjusted by a controller (not shown) connected to the accumulators 255 and 256.

The accumulator 261 of the second accumulator bank 260 accumulates the signal $\Phi^1(m)$ output from the multiplier 232 every 10 symbols then performs output, and the accumulator 262 accumulates the signal $\Phi^2(m)$ output from the multiplier 242 every 10 symbols then performs output. Accumulation every 10 symbols is performed since the depatternization length of the second accumulator bank 260 is 10.

The non-coherent adder 263 receives the signals accumulated in and output from the accumulator 261, and adds and outputs signals having in-phase and quadrature-phase elements. The non-coherent adder 264 receives the signals accumulated in and output from the accumulator 262, and similarly adds and outputs signals having in-phase and quadrature-phase elements.

The accumulator 265 accumulates the signals output from the non-coherent adder 263 by as many as several slots (N slots), then performs output as an accumulation result signal S10_Ant1 according to the antenna 1 pattern. The accumulator 266 accumulates the signals output from the non-coherent adder 264 by as many as several slots (N slots), then performs output as an accumulation result signal S10_Ant2 according to the antenna 2 pattern. Here, a slot length N may be adjusted as described above, i.e., by a controller (not shown) connected to the accumulators 265 and 266.

In the case where the base station is not using STTD encoding, only a pattern corresponding to antenna 1 as shown in Equations 2 and 3 is transmitted. Since the patterns of the two antennas have the property of being orthogonal to one another, a predetermined amount of energy is measured in the S2_Ant1 output by the accumulator 255 of the first accumulator bank 250, and 0 energy is measured in the S2_Ant2 output by the accumulator 256 of the first accumulator bank 250.

Similarly, a predetermined amount of energy is measured in the S10_Ant1 output by the accumulator 265 of the second accumulator bank 260, and 0 energy is measured in S10_Ant2 output by the accumulator 266 of the second accumulator bank 260.

In the case where the base station is using STTD encoding, since a result in which the two antenna patterns are combined is transmitted, similar levels of energy are measured in the accumulators 255 and 256 of the first accumulator bank 250 and the accumulators 265 and 266 of the second accumulator bank 260.

In theory, if there is no frequency offset or a multi-path fading channel, a difference in energy between the two measured outputs S2_Ant1 and S2_Ant2 of the first accumulator bank 250 takes on an unlimited value in the case where STTD encoding is not being used by the base station, while the difference in energy becomes 0 dB if the base station is using STTD encoding. Therefore, it may be determined that STTD encoding is not being used if the difference in energies of the outputs S2_Ant1 and S2_Ant2 of the first accumulator bank 250 is large, and that STTD encoding is being used if this difference in energies is small. Accordingly, the determination of whether STTD encoding is being used by the base station may be made using only the first accumulator bank 250 and not the second accumulator bank 260.

However, in actual practice, the above results are unable to be obtained in a state where there exist distortions as a result of frequency offset and a multi-path fading channel. If the distortions are severe, there are instances where there is no difference in energy between the two outputs in the case where STTD encoding is not being used, and instances where the difference in energies is large in the case where STTD encoding is being used. As a result, it is extremely difficult to determine whether STTD encoding is being used by the base station using only one accumulator bank, such as the first accumulator bank 250.

Through simulation, it is known that at specific frequency-offset values, the difference in energies of the above outputs is reversed. For example, when the frequency-offset value is varied in the case where STTD encoding is not used, a frequency-offset value is reached such that the energy value corresponding to antenna 1 becomes smaller than the energy value corresponding to antenna 2. If the frequency-offset value continues to be varied in the same direction, the energy value of antenna 2 again increases to exceed the energy value of antenna 1. This critical frequency-offset value varies according to the depatternization length of the accumulator banks.

As described above, since it is difficult to determine whether the base station is using STTD encoding using only a single accumulator bank, it is preferable to use two accumulator banks having different critical values, that is, different depatternization lengths.

In the preferred embodiment of the present invention, as shown in FIG. 4, the first accumulator bank 250 having a depatternization length of 2 and the second accumulator bank 260 having a depatternization length of 10 are used to determine whether the base station is using STTD encoding. The depatternization lengths of 2 and 10 are values that have been shown through experimentation to allow a frequency offset of up to 3 ppm.

Accordingly, determination results of the two outputs S2_Ant1 and S2_Ant2 of the first accumulator bank 250 and determination results of the two outputs S10_Ant1 and S10_Ant2 of the second accumulator bank 260 may be different. That is, depending on the particular frequency-offset value, one of either the first accumulator bank 250 or the second accumulator bank 260 makes an incorrect determination, while the other of either the first accumulator bank 250 or the second accumulator bank 260 makes a correct determination.

As a result, the final determining unit 270 receives the result signals S2_Ant1, S2_Ant2, S10_Ant1, and S10_Ant2 of the first and second accumulator banks 250 and 260, and correctly determines if the base station is using STTD encoding. A signal of this final determination is output by the final determining unit 270.

In more detail, the final determining unit 270 performs a calculation using Equation 4 shown below on the signals S2_Ant1 and S2_Ant2 output by the first accumulator bank 250 and the signals S10_Ant1 and S10_Ant2 output by the second accumulator bank 260, and outputs results. Following this process, the final determining unit 270 performs a logical OR calculation on values resulting from performing the calculation using Equation 4 on the output signals S2_Ant1 and S2_Ant2 of the first accumulator bank 250 and the output signals S10_Ant1 and S10_Ant2 of the second accumulator bank 260, thereby obtaining a final result value. The final result value becomes an STTD encoding use-determination signal, and result values, processed differently depending on whether the depatternization length is 2 or 10, undergo a logical OR calculation to obtain a final determination result. Accordingly, even if an incorrect determination is made by one of either the first accumulator bank 250 or the second accumulator bank 260 because of the critical frequency-offset value, the other of either the first accumulator bank 250 or the second accumulator bank 260 makes a correct determination such that a precise final determination is calculated.

$$\Psi = \begin{cases} STTS \text{ encoding not used when max} \\ \left\{ \left( \sum_{m=0}^{N-1} \Phi^1(m), \sum_{m=0}^{N-1} \Phi^2(m) \right) \right\} K_{TH} \min \left\{ \sum_{m=0}^{N-1} \Phi^1(m), \sum_{m=0}^{N-1} \Phi^2(m) \right\} \\ STTS \text{ encoding used otherwise} \end{cases} \quad [\text{Equation 4}]$$

where N is an accumulation length and $K_{Th}$ is a critical value.

Figure 5:
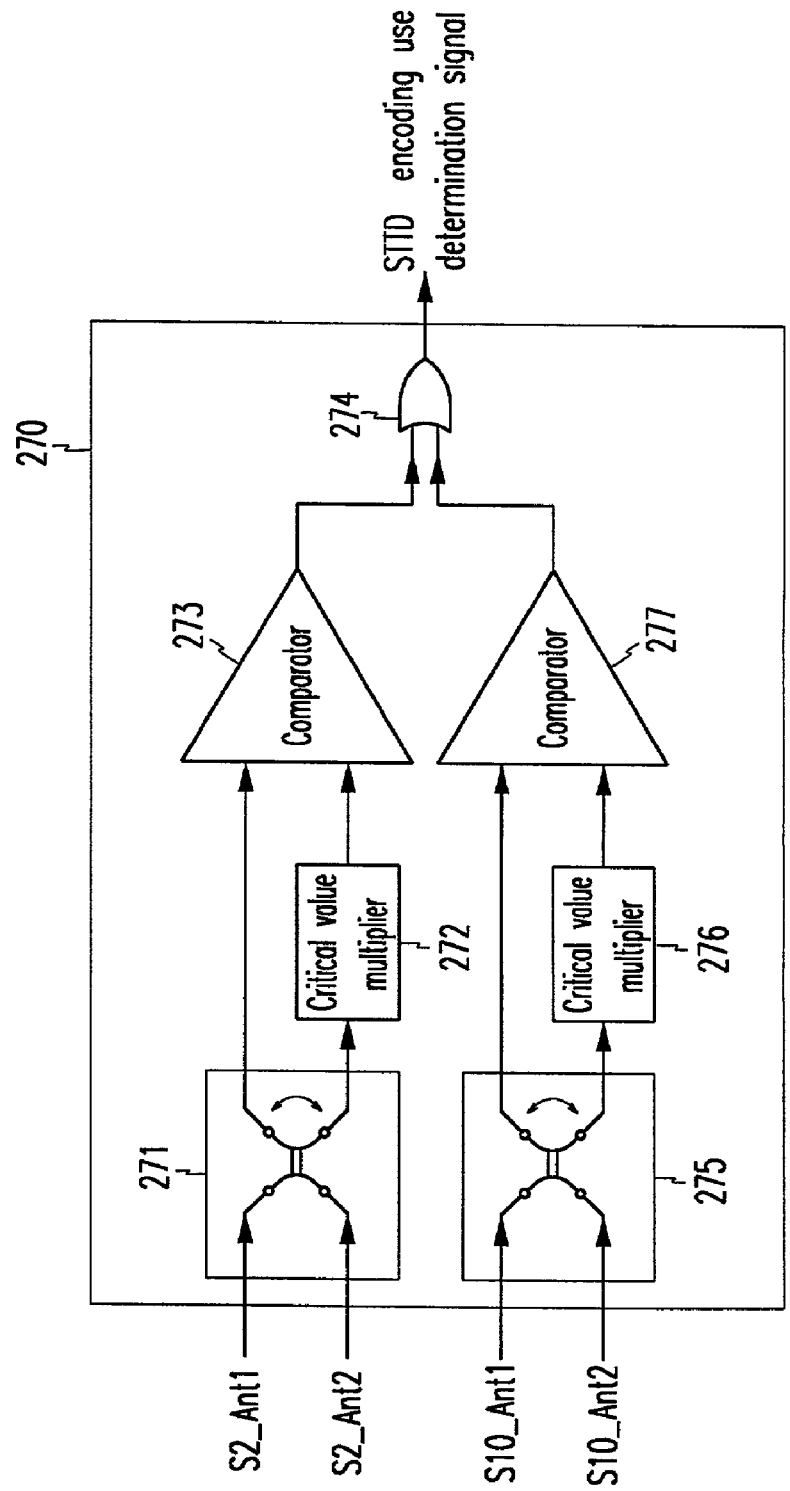
FIG. 5 is a detailed block diagram of a final determining unit shown in FIG. 2.

A structure for enabling the final determining unit 270 to perform this function is shown in FIG. 5.

FIG. 5 is a detailed block diagram of the final determining unit 270 shown in FIG. 2.

As shown in FIG. 5, the final determining unit 270 includes two comparator switches 271 and 275, two critical value multipliers 272 and 276, two comparators 273 and 277, and a logical OR gate 274.

The calculation using Equation 4 with respect to the signals S2_Ant1 and S2_Ant2 output from the first accumulator bank 250 is realized by the comparator switch 271, the critical value multiplier 272, and the comparator 273. Also, the calculation using Equation 4 with respect to the signals S10_Ant1 and S10_Ant2 output from the second accumulator bank 260 is realized by the comparator switch 275, the critical value multiplier 276, and the comparator 277.

The calculation with respect to the signals S2_Ant1 and S2_Ant2 output from the first accumulator bank 250 will first be described.

The comparator switch 271 compares the signals S2_Ant1 and S2_Ant2 output from the first accumulator bank 250 and sends the signal with the larger value to a left path (i.e., to the comparator 273) and the signal with the smaller value to a right path (i.e., to the critical value multiplier 272).

The critical value multiplier 272 multiplies the smaller value output from the comparator switch 271 by a pre-established critical value $K_{Th}$ and then outputs a result to the comparator 273.

The comparator 273 compares the larger value output from the comparator switch 271 with a multiplication result value output from the critical value multiplier 272, and outputs a comparison result value.

Next, in the calculation with respect to the signals S10_Ant1 and S10_Ant2 output from the second accumulator bank 260, the same processes are performed by the comparator switch 275, the critical value multiplier 276, and the comparator 277 as described above with respect to the signals S2_Ant1 and S2_Ant2 output from the first accumulator bank 250.

Subsequently, the logical OR gate 274 performs a logical OR operation on the signals output by the comparators 273 and 277, then outputs a final result, that is, a result of whether the base station is using STTD encoding.

Table 1 below shows a rate of acquisition of STTD encoding for different frequency offsets in a multi-path fading channel provided in 3GPP when a power ratio (Ior/Ioc) between a received home cell and another cell is −5 dB. Table 2 shows STTD encoding acquisition rates for different power ratios (Ior/Ioc). As shown in Tables 1 and 2, in the preferred embodiment of the present invention, even with variations in frequency offsets and power ratios, a precise determination of whether STTD encoding is being used by a base station may be made.

TABLE 1

Ior/Ioc = −5 dB, accumulation length (N) = 5 frames, multi-path channel case 3

| | Frequency offset (ppm) | | | |
|---|---|---|---|---|
| | 0 | 1 | 2 | 3 |
| STTD encoding not used | 1 | 1 | 1 | 1 |
| STTD encoding used | 0.955 | 0.985 | 0.955 | 0.985 |

TABLE 2

Accumulation length (N) = 5 frames, frequency offset = 3 ppm, multi-path channel case 3

| | Ior/Ioc (dB) | | | | |
|---|---|---|---|---|---|
| | −5 | −3 | −1 | 1 | 3 |
| STTD not used | 1 | 1 | 1 | 1 | 1 |
| STTD used | 0.985 | 0.995 | 1 | 1 | 1 |

According to the present invention, in a multi-path fading channel environment, a determination of whether STTD encoding of the base station is being used may be precisely made to allow for accurate compensation of the frequency offset, thereby improving the overall performance of a demodulator.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A system in an asynchronous mobile communications system and located in a mobile station for determining use of space-time block-coding-based transmit diversity encoding in a base station that includes two transmission antennas, the system comprising:

a cell search unit for detecting frame timing information and scrambling codes of the base station from signals output from the base station;

a descrambling unit for descrambling the signals output from the base station using the frame timing information and the scrambling codes, which are detected by the cell search unit;

an accumulation processor for despreading the signals descrambled by the descrambling unit;

a depatternization unit for performing depatternization of the signals despread by the logic processor using pilot symbol patterns corresponding to the two transmission antennas of the base station; and an accumulator bank unit for performing accumulation and addition processes of the signals that have undergone depatternization by the depatternization unit to output signals corresponding to the transmission antennas;

wherein energy values of the signals corresponding to the two transmission antennas and output from the accumulator bank unit are compared to determine if space-time block-coding-based transmit diversity encoding of the base station is being used.

2. The system of claim 1 wherein the descrambling unit comprises:

a scrambling code generator for generating scrambling codes that are synchronized with the frame timing of the base station using the frame timing information and the scrambling code detected by the cell search unit; and a multiplying processor for multiplying the scrambling codes generated by the scrambling code generator by the signals output by the base station.

3. The system of claim 1 wherein the depatternization unit comprises:

a symbol pilot generator for generating pilot symbol patterns corresponding to the two transmission antennas of the base station; and a multiplier for multiplying each of the pilot symbol patterns generated by the symbol pilot generator by the signals despread by the accmulation processor.

4. The system of claim 1 wherein the accumulator bank unit comprises:

a first accumulator for accumulating each signal, which has undergone depatternization by the depatternization unit, at every predetermined number of symbols, the predetermined number corresponding to a predetermined depatternization length;

a non-coherent adding unit receiving input of each signal accumulated by the first accumulator, and adding and outputting signals having in-phase and quadrature-phase elements; and a second accumulator receiving each of the signals output by the non-coherent adding unit, accumulating the signals by as much as a predetermined accumulation length, and outputting the signals as signals corresponding to each of the two transmission antennas.

5. The system of claim 1 wherein the cell search unit uses, among channels transmitted from the base station, a common pilot channel to detect the frame timing information and the scrambling codes of the base station.

6. The system of claim 1 wherein the pilot symbol patterns used by the depatternization unit are orthogonal to one another.

7. A method in an asynchronous mobile communications system for determining use of space-time block-coding-based transmit diversity encoding in a base station comprising:

(a) detecting scrambling codes through a common pilot channel transmitted from the base station which includes two transmission antennas;

(b) generating pilot symbols using the detected scrambling codes;

(c) performing depatternization of the generated pilot symbols using pilot symbol patterns corresponding to each of the two transmission antennas;

(d) performing accumulation and addition processes of the two pilot symbols having undergone depatternization, and outputting the symbols as signals corresponding to each of the two transmission antennas; and (e) comparing energy values of the two output signals corresponding to the transmission antennas to determine if space-time block-coding-based transmit diversity encoding of the base station is being used.

8. The method of claim 7 wherein step (b) comprises:

(i) descrambling signals transmitted from the base station using the scrambling codes detected in step (a); and (ii) generating pilot symbols by performing despreading of the signals descrambled in step (i).

9. The method of claim 7 wherein step (c) comprises:

(i) generating pilot symbols using pilot symbol patterns corresponding to each of the two transmission antennas; and (ii) multiplying each of the pilot symbol patterns generated in step (i) by the pilot symbols generated in step (b).

10. The method of claim 7 wherein step (d) comprises:

(i) accumulating the two pilot symbols having undergone depatternization in step (c) at every predetermined number of symbols, the predetermined number corresponding to a predetermined depatternization length;

(ii) receiving the signals accumulated in step (i), and adding signals having in-phase and quadrature-phase elements; and (iii) accumulating the signals added in step (ii) by as much as a predetermined accumulation length, and outputting the signals as signals corresponding to each of the two transmission antennas.

11. The method of claim 9 wherein the pilot symbol patterns used in step (c) are orthogonal to one another.

12. A system in an asynchronous mobile communications system and located in a mobile station for determining use of space-time block-coding-based transmit diversity encoding in a base station that includes two transmission antennas, the system comprising:

a cell search unit for detecting frame timing information and scrambling codes of the base station from signals output from the base station;

a descrambling unit for descrambling the signals output from the base station using the frame timing information and the scrambling codes, which are detected by the cell search unit;

an accumulation processor for despreading the signals descrambled by the descrambling unit;

a depatternization unit for performing depatternization of the signals despread by the accumulation processor using pilot symbol patterns corresponding to the two transmission antennas of the base station;

two or more accumulator bank units for performing accumulation and addition processes of the signals that have undergone depatternization by the depatternization unit to output signals corresponding to the two transmission antennas, depatternization lengths of each of the two or more accumulator bank units being different; and a final determining unit receiving the signals corresponding to the two transmission antennas and output by the two or more accumulator bank units in order to perform a final determination of whether space-time block-coding-based transmit diversity encoding of the base station is being used.

13. The system of claim 12 wherein each of the two or more accumulator bank units comprises:

a first accumulator for accumulating each signal, which has undergone depatternization by the depatternization unit, at every predetermined number of symbols, the predetermined number corresponding to a predetermined depatternization length;

a non-coherent adding unit receiving input of each signal accumulated by the first accumulator, and adding and outputting signals having in-phase and quadrature-phase elements; and a second accumulator receiving each of the signals output by the non-coherent adding unit, accumulating the signals by as much as a predetermined accumulation length, and outputting the signals as signals corresponding to each of the two transmission antennas.

14. The system of claim 12 wherein the final determining unit comprises:

two or more comparator switches, each comparing the two signals output by the two or more accumulation bank units to each output the signals through different paths according to size of the signals;

two or more critical value multipliers for multiplying a signal of a small size output from the two or more comparator switches by a predetermined critical value;

two or more comparators for comparing a signal of a large size output from the two or more comparator switches with a signal output from the critical value multipliers, and outputting a comparison result value; and a logical OR gate for performing a logical OR calculation of comparison values output from each of the two or more comparators to output a final determination signal of whether space-time block-coding-based transmit diversity encoding of the base station is being used.

15. The system of claim 12 wherein the cell search unit uses, among channels transmitted from the base station, a common pilot channel to detect the frame timing information and the scrambling codes of the base station.

16. The system of claim 12 wherein the pilot symbol patterns used by the depatternization unit are orthogonal to one another.

17. A system in an asynchronous mobile communications system and located in a mobile station for determining use of space-time block-coding-based transmit diversity encoding in a base station that includes two transmission antennas, the system comprising:

a cell search unit for detecting frame timing information and scrambling codes of the base station from signals output from the base station;

a descrambling unit for descrambling the signals output from the base station using the frame timing information and the scrambling codes, which are detected by the cell search unit;

an accumulation processor for despreading the signals descrambled by the descrambling unit;

a depatternization unit for performing depatternization of the signals despread by the logic processor using pilot symbol patterns corresponding to the two transmission antennas of the base station; and an accumulator bank unit for performing accumulation and addition processes of the signals that have undergone depatternization by the depatternization unit to output signals corresponding to the transmission antennas wherein the accumulator bank unit comprises:

a first accumulator for accumulating each signal, which has undergone depatternization by the depatternization unit, at every predetermined number of symbols, the predetermined number corresponding to a predetermined depatternization length;

a non-coherent adding unit receiving input of each signal accumulated by the first accumulator, and adding and outputting signals having in-phase and quadrature-phase elements; and a second accumulator receiving each of the signals output by the non-coherent adding unit, accumulating the signals by as much as a predetermined accumulation length, and outputting the signals as signals corresponding to each of the two transmission antennas.

18. The system of claim 17 wherein the descrambling unit comprises:

a scrambling code generator for generating scrambling codes that are synchronized with the frame timing of the base station using the frame timing information and the scrambling code detected by the cell search unit; and a multiplying processor for multiplying the scrambling codes generated by the scrambling code generator by the signals output by the base station.

19. The system of claim 17 wherein the depatternization unit comprises:

a symbol pilot generator for generating pilot symbol patterns corresponding to the two transmission antennas of the base station; and a multiplier for multiplying each of the pilot symbol patterns generated by the symbol pilot generator by the signals despread by the accmulation processor.

20. The system of claim 17 wherein the cell search unit uses, among channels transmitted from the base station, a common pilot channel to detect the frame timing information and the scrambling codes of the base station.

21. The system of claim 17 wherein the pilot symbol patterns used by the depatternization unit are orthogonal to one another.

22. The system of claim 17 wherein energy values of the signals corresponding to the two transmission antennas and output from the accumulator bank unit are compared to determine if space-time block-coding-based transmit diversity encoding of the base station is being used.

* * * * *